Patented Aug. 27, 1940

2,212,935

UNITED STATES PATENT OFFICE 2,212,935

TITANIUM PIGMENT AND PROCESS FOR PRODUCING THE SAME

Marion L. Hanahan, Wilmington, and Robert M. McKinney, Roselle, Del., assignors to E. I. du Pont de Nemours & Company, Wilmington, Del., a corporation of Delaware No Drawing. Application April 8, 1938, Serial No. 200,912

10 Claims. (Cl. 134—58)

This invention relates to the production of stable titanium pigments, and more particularly to the production of weather-resistant titanium oxide and extended titanium oxide pigments.

The present application is a continuation-in-part of our copending application Serial No. 138,583, filed April 23, 1937.

Titanium pigments employed in paints and similar coating compositions chalk and fade badly on exposure to weathering influences and light. Additionally, when employed in interior paints or high temperature baking enamels, these pigments exhibit a marked tendency towards discoloration or yellowing. These properties are obviously very objectionable and seriously and adversely affect the utility of such pigments.

It is among the objects of this invention to overcome these objectionable features in prior titanium pigments, and to provide a treated and improved titanium pigment which is remarkably stable and resistant against weathering, discoloration, chalking, or lack of tint retention.

A further and particular object of the invention includes the production of a titanium pigment which is substantially free from soluble salts, and the provision of a process for treating titanium pigments which eliminates and avoids the introduction of soluble salts into the pigment during treatment. This is very advantageous because the adsorptive nature of the pigment is such that soluble salts cannot be completely removed by washing, and, unless present only to a negligible extent, exert a severe and adverse effect upon the durability characteristics of exterior paints and coating compositions in which the pigment may be employed.

The foregoing objects and advantages, as well as others, are obtainable in the present invention, which broadly comprises subjecting a titanium pigment to treatment with an insoluble aluminum compound by reacting aluminum sulfate with a compound of a metal, the sulfate of which is water-insoluble or only sparingly soluble.

In a more specific and preferred embodiment, the invention comprises adding aluminum sulfate to a water slurry of calcined titanium oxide, and precipitating the aluminum on the pigment in the form of a hydrated oxide by addition of an alkaline earth metal hydroxide, according to the equation:

$$Al_2(SO_4)_3 + 3Me(OH)_2 \rightarrow 2Al(OH)_3 + 3MeSO_4$$

wherein Me equals barium, calcium, or strontium.

In one preferred adaptation, a solution of aluminum sulfate is added to a water slurry of the titanium pigment during agitation. The pH of the slurry is gradually adjusted to neutralization by addition, during vigorous stirring, of a suitable quantity of an alkaline earth metal hydroxide solution, preferably barium hydroxide. Neutralization and addition of the hydroxide induces precipitation of the aluminum on the pigment in the form of insoluble aluminum hydrate. The slurry is then filtered, the pigment dried and ground, and is then ready for use.

In order that the invention may be more clearly understood, the following specific examples are given, each of which is merely illustrative in character:

Example I 30,360 parts by weight of a calcined, wet ground titanium oxide slurry containing 9080 parts by weight of titanium oxide was diluted with sufficient water to permit efficient stirring, the titanium oxide concentration then being about 20% by weight of the slurry. To this slurry was then added 593 parts by weight of $Al_2(SO_4)_3.18H_2O$ dissolved in about two thousand parts of water which represents an amount of aluminum equivalent to 1% aluminum oxide on the basis of the titanium oxide. After thorough stirring to insure uniform mixing of the aluminum sulfate solution with the pigment, aqueous barium hydroxide solution was slowly added with vigorous stirring to the slurry. Addition of barium hydroxide was continued until the slurry had a pH 7.0 to 7.2. The slurry was then filtered and the pigment dried, after which it was dry ground and was then ready for use.

The resultant pigment was formulated in a baking enamel based on a drying oil modified polyhydric alcohol-polybasic acid resin in which the drying oil content was 50%. Pigmentation was made in the ratio of 80 parts by weight of pigment to 100 parts vehicle solids. The enamel was sprayed on metal panels and then baked for one hour at 260° F. A second coat was applied and baked in the same manner. For comparative purposes an enamel was prepared in the same manner but pigmented with untreated titanium oxide. These panels were placed on indoor exposure in a well lighted room and after 16 months exposure the panel coated with the enamel containing untreated $TiO_2$ had discolored badly whereas the composition containing the treated $TiO_2$ exhibited very good color retention. These panels were graded on an arbitrary scale in which one unit represented a distinct visual color difference. On this scale the composition containing the pigment of Example I showed a superiority of approximately 17 units over the similar composition pigmented with untreated titanium oxide.

Example II 500 parts by weight of finished, dry titanium oxide was slurried in 1750 parts by weight of water and ground in a colloid mill to eliminate aggregated material. 21.3 parts by weight of $Al_2(SO_4)_3 \cdot 18H_2O$ was dissolved in 200 parts by weight $H_2O$ and added to the slurry with vigorous stirring. The slurry was then neutralized to a pH of 7.0 by gradually adding a dilute suspension of calcium hydroxide to the slurry. The calcium hydroxide slurry was added very slowly and with good agitation to avoid the possibility of any free calcium hydroxide remaining with the pigment. The slurry was then filtered and the pigment dried. The amount of aluminum added was equivalent to 0.65% aluminum oxide on the basis of the titanium oxide content.

The resultant pigment, when incorporated in an exterior paint formulation and exposed to weathering for a period of two months on a test panel, exhibited no tendency towards chalking, discoloration or lack of tint retention. On the other hand, a similar but untreated pigment, when incorporated in a like paint formulation, and subjected to a like test, chalked and discolored badly within a period of a week and exhibited a marked lack of tint retention.

While in the foregoing examples, a solution of barium hydroxide and a suspension of calcium hydroxide have been employed, it will be apparent that solutions or suspensions of strontium hydroxide may also be employed. Similarly, while in the preferred adaptation of our invention, the hydroxides of these metals are utilized, other alkaline earth metal compounds which form insoluble sulfates may also be used, such as barium carbonate, calcium carbonate, or strontium carbonate, etc.

It will be seen that the invention can be applied to the treatment of a dry finished titanium oxide pigment which has been slurried in water or the pigment may be treated at any convenient point in the process, after calcination. In titanium oxide pigment manufacture, the pigment is usually dispersed and wet ground after calcination. The treatment may be applied to this dispersed material or it can be equally well applied to the flocculated pigment during or at any point in the finishing process. Similarly, pigment treatment may be effected by separately precipitating and subsequently blending the agent with the pigment, preferably while in aqueous slurry.

In the preferred practice of the invention, it will be found that relatively small and minor amounts of hydrated aluminum oxide need be applied to the pigments and that in most instances it will be undesirable and unnecessary to employ in excess of substantially 2%, expressed as aluminum oxide and based on the weight of the pigment. Usually, about 1% of agent will be found sufficient, although in the obtainment of maximum effectiveness and pigments of consistently uniform superiority, we preferably employ amounts ranging from substantially .02% to 1.5%, calculated as added aluminum oxide. The employment of this low range, in addition to affording desired effectiveness, maintains the titanium oxide content of the pigment desirably high and avoids any unnecessary dilution of the pigment with consequent sacrifice in covering power and other essential pigmentary properties. We have found that treatments with amounts of reagent equivalent to about 0.3% to 0.5% aluminum oxide are also particularly and desirably effective; that when a pigment is treated with an amount of agent equivalent to 0.15% aluminum oxide, it exhibits marked advantages over an untreated pigment as regards chalk-resistant properties and resistance to discoloration in the light, particularly when used in an enamel based on a drying oil modified polyhydric alcohol-polybasic acid resin vehicle.

Exposures of enamels formulated with our treated pigments have been made and the data are given hereunder in Table I. In these tests the treated titanium oxide was the sole pigment and the vehicle was a polyhydric alcohol-polybasic acid enamel of the type used in the manufacture of white interior finishes. The panels were spray coated and the dried film exposed to diffuse daylight in the laboratory with half of the panel covered so as to note differential yellowing between the two portions.

After three months the films were measured by spectro-photometric methods. The more important data obtained are given.

Table I

| Sample | Percent Al | Time exposed (Months) | Dominant wave length | Excitation purity (Percent) |
| --- | --- | --- | --- | --- |
| 1 | 0 | 0 | 560 | 1.2 |
|   |   | 3 | 570 | 5.0 |
| 2 | 1 | 0 | 551 | 0.8 |
|   |   | 3 | 551 | 0.5 |
| 3 | 2 | 0 | 543 | 0.6 |
|   |   | 3 | 550 | 0.5 |

In the above table the dominant wave length and excitation purity for both the exposed and the unexposed portions are given. The excitation purity is a measure of the deviation of a near white from a neutral white in the direction of the dominant wave length. (See "Handbook of Colorimetry" by A. C. Hardy, Technology Press, Mass. Institute of Technology, 1936, page 12. The higher of value for excitation purity the greater the deviation from neutral white, or, in the case under consideration, the more yellow the film.

It will be noted that the exposed enamels made from my treated pigments gave noticeably lower values for excitation purity as compared to the untreated control and therefore a whiter appearance. This differential yellowing is of such magnitude that it can be noticed by an untrained observer at some distance from the panel. Furthermore, the exposed and unexposed portions of the panel have similar appearances when using my treated pigment, whereas the exposed portion is quite yellow in the case of the untreated pigment.

Accordingly, the composition of our improved titanium pigment will comprise titanium dioxide or other titanium pigment, with which is associated not more than substantially 2% of hydrated aluminum oxide, calculated as aluminum oxide, and the corresponding chemically equivalent amount of alkaline earth metal sulfate. For example, the added hydrated aluminum oxide, calculated as the oxide in the pigment, may range from about .02% to 2%, and the alkaline earth metal sulfate may range from about .14% to 14%. Preferably, however, we treat the pigment with an amount of added aluminum hydrate, calculated as the oxide, ranging from about .02 to 1.5% and with an amount of alkaline earth metal sulfate, preferably barium sulfate, ranging from about 2% to 10%. In a more specific and preferred instance, the titanium pigment is treated or associated with about 1% of hydrated aluminum oxide, calculated as the oxide, and about 6% of barium sulfate, or other alkaline earth metal sulfate. Thus the production of a titanium oxide pigment of maximum strength and hiding power is afforded, the titanium dioxide content of which may range as high as 92% or higher, equalling in effect a 100% product.

The treated pigments may be used in the same manner as the untreated pigments for indoor and outdoor coating composition formulations. These pigments have particular value in white or light colored enamels designed principally for indoor use where yellowing in the light is most apparent and consequently a distinct fault. Such compositions formulated with untreated titanium oxide show a gradual color change on exposure to the light which is usually yellowish, yellowish brown, or even reddish brown. In certain compositions this color change is so severe that titanium oxide cannot be used as a pigment and other lower hiding pigments must be used in lieu thereof, which is a distinct disadvantage. By the use of the treated pigments of the present invention, such compositions exhibit a very marked improvement in color stability, weathering and chalk-resistance.

The results of actual exposure tests have proven that the new pigment, when incorporated in cellulose nitrate vehicles, affords a highly chalk-resistant finish, a result which is quite unexpected in view of the known deleterious chalking tendencies of cellulose nitrate type finishes which contain untreated titanium dioxide. The noteworthy improvements in chalk-resistance afforded in the use of the new pigment are apparent in the conventional cellulose nitrate vehicles where natural resins, softeners and plasticizers are present as essential ingredients, as well as in the more recently developed type of cellulose nitrate composition which includes appreciable proportions of synthetic resins, for example, a modified alkyd type resin.

In addition to the production of an improved pigment wherein maximum effectiveness of a small amount of aluminum hydrate present is developed, it will be seen that the invention affords the obtainment of other important advantages. For instance, since no by-product water-soluble salts of the precipitation reaction are produced, introduction of such salts into the pigment during treatment is effectively avoided. As stated, the introduction or addition of soluble salts into the pigment adversely affects the durability qualities of paints and coating compositions, particularly those employed in exterior compositions. Due to the adsorptive nature of the pigment, soluble salts cannot be completely removed by washing or other known treatments, and if present in the pigment in an amount up to substantially .25%, will not seriously impair its pigmentary properties. Such amount is relatively minor and negligible in extent and is unavoidably present in the pigment as a result of normal processing and as an impurity introduced from materials employed in pigment production. Accordingly, it will be seen that the treated pigment of the present invention is substantially free from and contains less than substantially .25% of water-soluble salts, thus providing an improved pigment which when incorporated in outside paints or coating compositions insures maximum film durability. A further advantage of the invention lies in the elimination of undesired after-treatment and thus affords a very definite process simplification. This is particularly important in the production of pigments on a plant scale, since our treatment may be applied to a water slurry of the finished pigment with an absolute minimum of additional equipment and by a simple additional process step which is very economical from the standpoint of operation.

The treatment provided for may be applied to all types of titanium pigments, the term "titanium pigment", here and in the appended claims, being meant to include titanium oxide, titanium oxide chemically combined with other metal oxides, such as the titanates of magnesium, calcium, strontium, barium, zinc, and cadmium, etc., as well as titanium pigments associated with extenders such as the alkaline earth metal sulfates of calcium and barium, as well as silica, magnesium silicate and silicates in general.

We claim as our invention:

1. A process for producing a non-reactive, calcined, stable, weather-resistant titanium oxide pigment, substantially free of soluble salts comprising adding a predetermined amount of aluminum sulfate to a suspension of said pigment and precipitating from about .02% to not more than about 2% of an insoluble aluminum compound thereon, calculated as $Al_2O_3$, by reacting said sulfate with a compound from the group consisting of alkaline earth metal hydroxides and carbonates.

2. A process for producing a non-reactive, calcined, stable, weather-resistant titanium pigment substantially free of soluble salts comprising adding aluminum sulfate to a suspension of said pigment and precipitating not in excess of 2%, calculated as $Al_2O_3$, of an insoluble aluminum compound thereon by reacting said sulfate with an alkaline earth metal hydroxide.

3. A process for producing a non-reactive, calcined, stable, weather-resistant titanium pigment substantially free of soluble salts comprising adding aluminum sulfate to a suspension of said pigment and precipitating not to exceed 2%, calculated as $Al_2O_3$, of an insoluble aluminum compound thereon by reacting said sulfate with an alkaline earth metal carbonate.

4. A process for producing a non-reactive, calcined, stable, weather-resistant titanium pigment substantially free of soluble salts comprising adding aluminum sulfate to a water slurry of said pigment and precipitating not in excess of 2%, calculated as $Al_2O_3$, of hydrated aluminum oxide thereon by reacting said sulfate with an alkaline earth metal hydroxide.

5. A process for producing a non-reactive, calcined, stable, weather-resistant titanium pigment, substantially free of soluble salts comprising adding aluminum sulfate to a water slurry of titanium dioxide, and precipitating not in excess of 2%, calculated as $Al_2O_3$, of hydrated aluminum oxide thereon by reacting said sulfate with barium hydroxide.

6. A process for producing a non-reactive, calcined, stable, weather-resistant titanium pigment substantially free of soluble salts, comprising adding sufficient aluminum sulfate to a suspension of said pigment to precipitate an amount of aluminum hydroxide ranging from .02% to 1.5%, calculated as $Al_2O_3$, on said pigment by reacting said sulfate with an alkaline earth metal hydroxide.

7. A process for producing a non-reactive, calcined, stable, weather-resistant titanium pigment substantially free of soluble salts comprising adding sufficient aluminum sulfate to a suspension of said pigment to precipitate an amount of aluminum hydroxide, calculated as $Al_2O_3$, ranging from .02% to 1.5% on said pigment by reacting said sulfate with barium hydroxide.

8. A process for producing a non-reactive, stable, calcined titanium pigment substantially free of soluble salts, comprising reacting, in the presence of said titanium pigment, a predetermined amount of aluminum sulfate with a predetermined amount of a compound from the group consisting of alkaline earth metal hydroxides and carbonates, whereby from about .02% to not more than about 2% of insoluble hydrated aluminum oxide, calculated as $Al_2O_3$, and from about .14 to 14% of an insoluble alkaline earth metal sulfate becomes associated with said pigment.

9. As a new pigment composition, a non-reactive, calcined, stable, weather-resistant titanium pigment substantially free of soluble salts having co-precipitated thereon from about .02% to not more than substantially 2% of hydrated aluminum oxide, calculated as $Al_2O_3$, and from substantially .14% to 14% of an alkaline earth metal sulfate.

10. As a new pigment composition, a non-reactive, calcined, stable, weather-resistant titanium pigment substantially free of soluble salts having co-precipitated thereon from about 0.3% to not more than substantially 1.5% of hydrated aluminum oxide, calculated as $Al_2O_3$, and from substantially 2% to 10% of barium sulfate.

MARION L. HANAHAN.
ROBERT M. McKINNEY.